United States Patent [19]
Jorss
[11] Patent Number: 4,529,469
[45] Date of Patent: Jul. 16, 1985

[54] LABELING MACHINE

[75] Inventor: Norbert Jorss, Neutraubling, Fed. Rep. of Germany
[73] Assignee: Messrs. Carl Pirzer Co., Fed. Rep. of Germany

[21] Appl. No.: 498,828
[22] Filed: May 27, 1983 (Under 37 CFR 1.47)
[30] Foreign Application Priority Data
May 27, 1982 [DE] Fed. Rep. of Germany ....... 3219906
[51] Int. Cl.³ ...................... B32B 31/00; G05G 15/00; B31F 5/00; B65G 47/24
[52] U.S. Cl. .................................... 156/360; 156/378; 156/539; 156/556; 156/DIG. 27; 198/394; 198/382
[58] Field of Search ............... 156/360, 567, DIG. 25, 156/DIG. 26, DIG. 27, 542, 541, 363, 378, 361, 540, DIG. 10, DIG. 37, DIG. 18, 475, 556, 539; 198/379, 382, 388, 394, 414

[56] References Cited

U.S. PATENT DOCUMENTS 4,143,754 3/1979 Eldred ........................ 156/DIG. 26
4,280,612 7/1981 Nagano .............................. 198/394

*Primary Examiner*—Edward Kimlin
*Assistant Examiner*—Louis Falasco
*Attorney, Agent, or Firm*—Fred Wiviott

[57] ABSTRACT

A machine for labeling containers which are oriented vertically and have a bottom surface provided with a transverse jam recess that is at least partially radial to the longitudinal axis of the container. The machine includes a labeler and a work table moveable relative to the labeler. A plurality of plates are each mounted on the table for rotation about vertical axis and each plate includes a container supporting surface. A holder is disposed above each plate for vertical movement relative thereto. A counter jam is mounted on each rotary plate for movement between a first position below the container supporting surface and a second position in which a portion of the counter jam extends above the container supporting surface for cooperating with the jam recess of a container positioned on the support surface. At least three rollers are mounted on each rotary plate to support the container for rotational movement about its longitudinal axis relative to the rotary plate. The rollers of each group are positioned with a part of their peripheral surface above the upper support surface and each being mounted before rotation about an axis which extends radially relative to the container longitudinal axis to support the container for rotational movement relative to the plate. A drive is coupled to the rollers for rotating the same about their respective rotational axis.

17 Claims, 8 Drawing Figures

LABELING MACHINE

Figure 1:
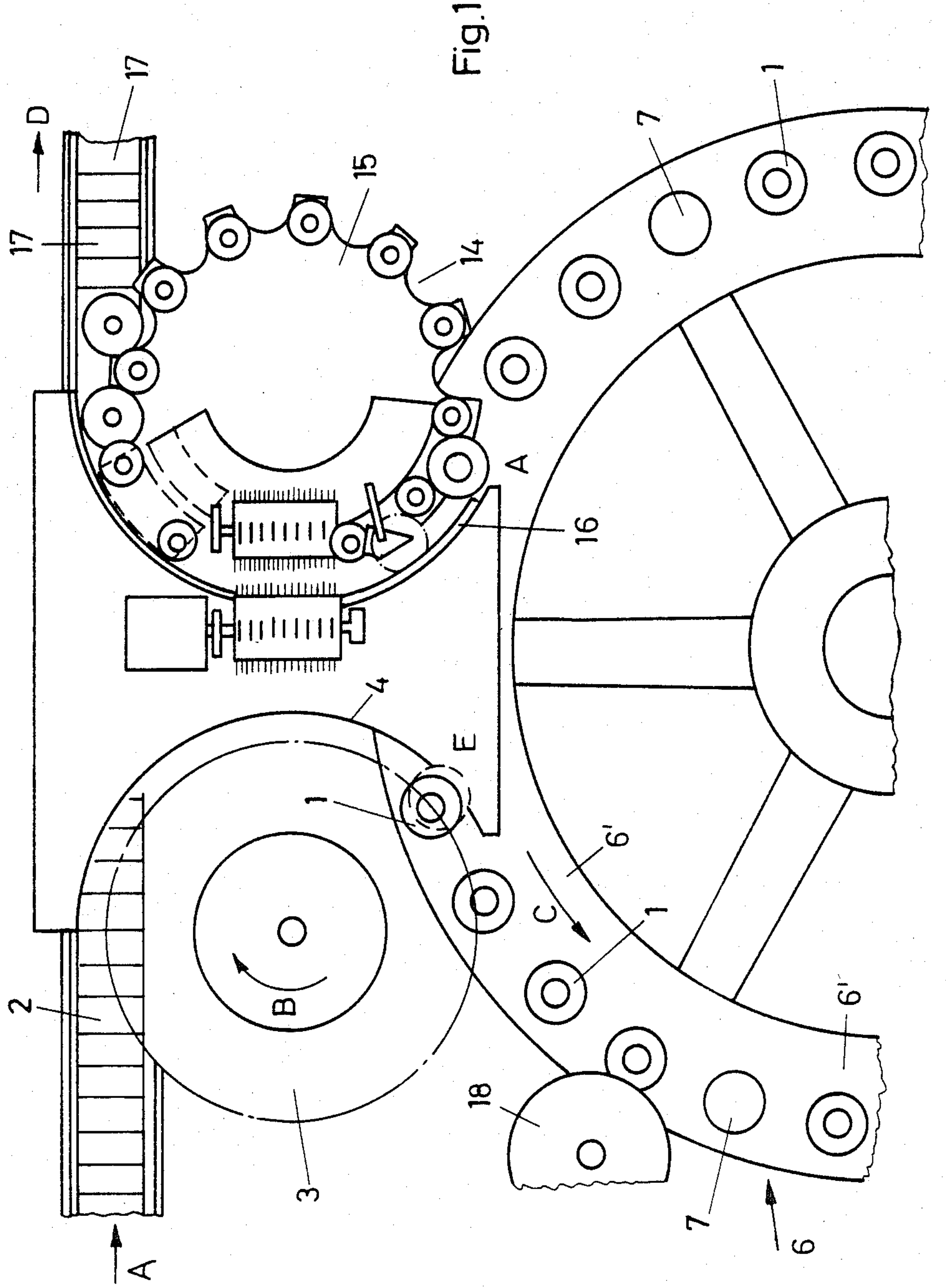

The invention pertains to a labeling machine to label upright containers especially bottles which have at their bottom surface a stop face which is transverse or vertical to this bottom surface and at least partially radial to the elevation axis of the bottle. This labeling machine has, relative to a labeling device, a movable worktable with controlable rotary plates on the worktable. Each of these plates form a standing surface for the containers. The labeling machine also has, over each rotary plate, a clamping device that can be raised and lowered.

Labeling machines with a worktable, moving passed a labeling mechanism or labeling station, on which worktable the bottles to be labeled are clamped between rotary plates and clamping devices are known. At the labeling station, the labels that are covered with a glue film are then e.g. by means of a gripper cylinder pressed onto the bottles to be labeled. After this follows at subsequent stations the final pressing-on or smoothing down of the labels by means of available components. It is hereby necessary to bring the bottles that stand on the rotary plates in a certain position which is achieved by the rotation of the rotary plates around a vertical axis or the elevation axis of the bottles.

It is frequently necessary to apply the labels with the greatest precision to a very exactly predetermined location at the exterior of the bottles. This applies e.g. to bottles with a special configuration or that have special configurations as regards their exterior surface, whereby a specific area of the bottle is reserved for label application so that this label constitutes an additional element in the design and configuration of the bottle itself, as is frequently the case today e.g. with liquor bottles. Even though the bottles are fed to the worktable in an upright position they are still in a purely random position. Since this is the case, it is necessary to bring the bottles, which stand on the rotary plates, in a proper position relative to the rotary plates before these bottles are fed past the labeling mechanism. This is achieved by rotating each bottle around its elevation axis relative to the appropriate rotary plate.

It is the task of the invention to design a labeling machine with an uncomplicated constructural configuration which enables the aforementioned corrective positioning of the bottles and consequently a label application in the exact bottle area therefore provided with consistent dependability.

To fulfill this task a labeling machine as initially described and relative to the invention is designed as follows. Each rotary plate has at least one counter stop face that adjoins the stop face; the counter stop face is movable from one position as it is under the standing surface of the appropriate rotary plate to a second position in that the counter jam face protrudes beyond this standing surface and means have been provided to bring about a movement of the container around its elevation axis relative to the counter jam face.

In the case of the invention related labeling machine, the counter jam face is preferably under tension by means of a spring, so that the counter jam face lies against the bottom surface of the container under spring tension while this container is being brought into the proper position. And once the container has been positioned properly the counter jam face rests in a hollow in the bottom surface of the container. This hollow forms with a lateral surface the jam surface. In the case of the invention related labeling machine containers or bottles can be handled which have the necessary jam surface for proper positioning, namely in the form of a hollow at the bottom surface, which is especially advantageous since such a jam surface can not be damaged during transport in contrast with a positioning device that protrudes beyond the bottle circumference, which type of positioning device is frequently used as jam surface.

Since the counter jam face in the case of the invention related labeling machine shows a first position in which this counter jam face does not protrude beyond the appropriate rotary plate, this counter jam face can be controlled so, that the rotary plate always has a level upper surface or standing surface, i.e. a surface without any protrusions and this while the bottles are being fed in or discharged.

It has been shown that a flawless positioning or turning of the containers around their elevation axis can be achieved even without the bottles tending to fall sideways from the rotary plates in question when the standing surface for the bottles on each rotary plate is formed by three rollers, which in each case can be rotated around an axis radial to the vertical axis around which the rotary plates rotate. Instead of these rollers one can also use a turn table or plate which forms the standing surface of the rotary plate whereby this turn table or plate on the rotary plate is mounted so that it can rotate around the vertical axis. Since the containers or bottles have a hollow in the center of their bottom surface, which hollow is drawn towards the inside, these containers or bottles stand on the rollers, the turn table or plate with a ring shaped bottom surface which envelopes this hollow.

When the appropriate container is being positioned, the rollers, turntable or plate are/is either being driven so that they/it rotate(s) or are/is freely rotatable, whereby in the latter case an element is provided for which acts directly upon the container in question and rotates this container around its elevation axis, e.g. a fixed guide bow with a wear strip.

Further configurations of the the invention are subject of the secondary claims.

The invention is explained in greater detail by means of the following figures, depicting configuration examples.

FIG. 1—a diagrammatic portrayal, partially in top view of a labeling machine, the work table of which is formed by a rotary table which rotates around a vertical axis.

Figure 2:
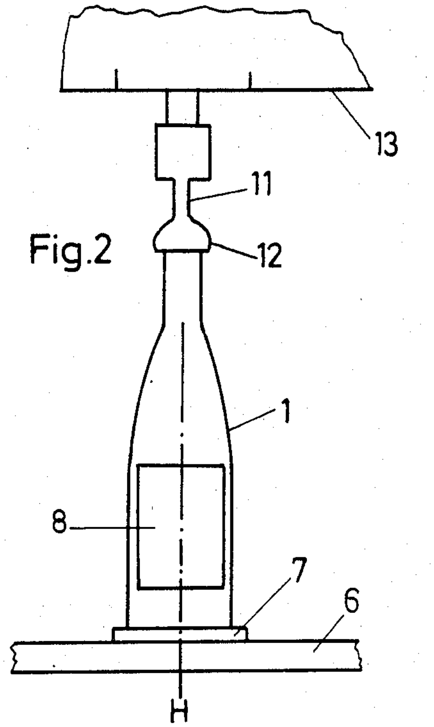

FIG. 2—the side view of a bottle in upright position on a rotary plate of the rotary table held or secured at its upper end (the bottle neck) by a clamping device which can be raised and lowered. This clamping device is on a part of the labeling machine which rotates with the rotary table.

Figure 3:
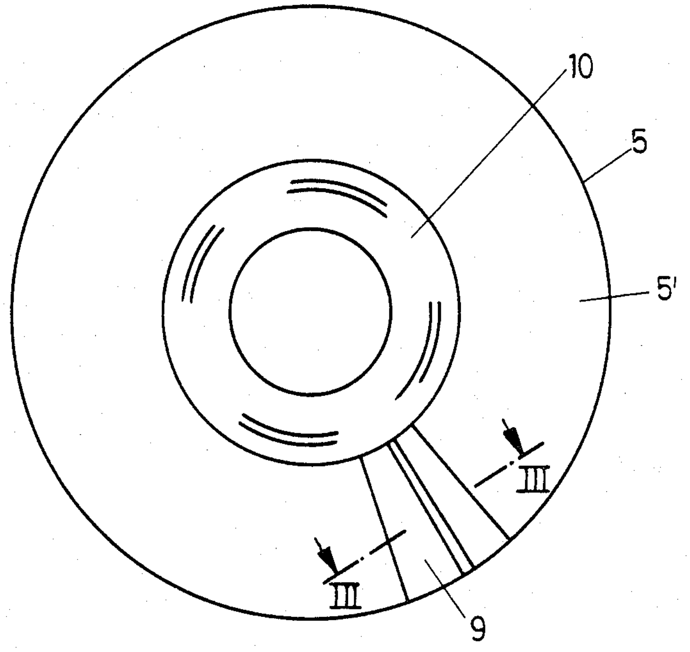

FIG. 3—a top view of the bottom of the bottle as in FIG. 2.

Figure 4:
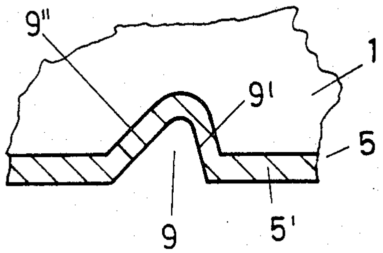

FIG. 4—a partial portrayal of a sectional view of the bottom of the bottle, being section III—III of FIG. 3.

Figure 5:
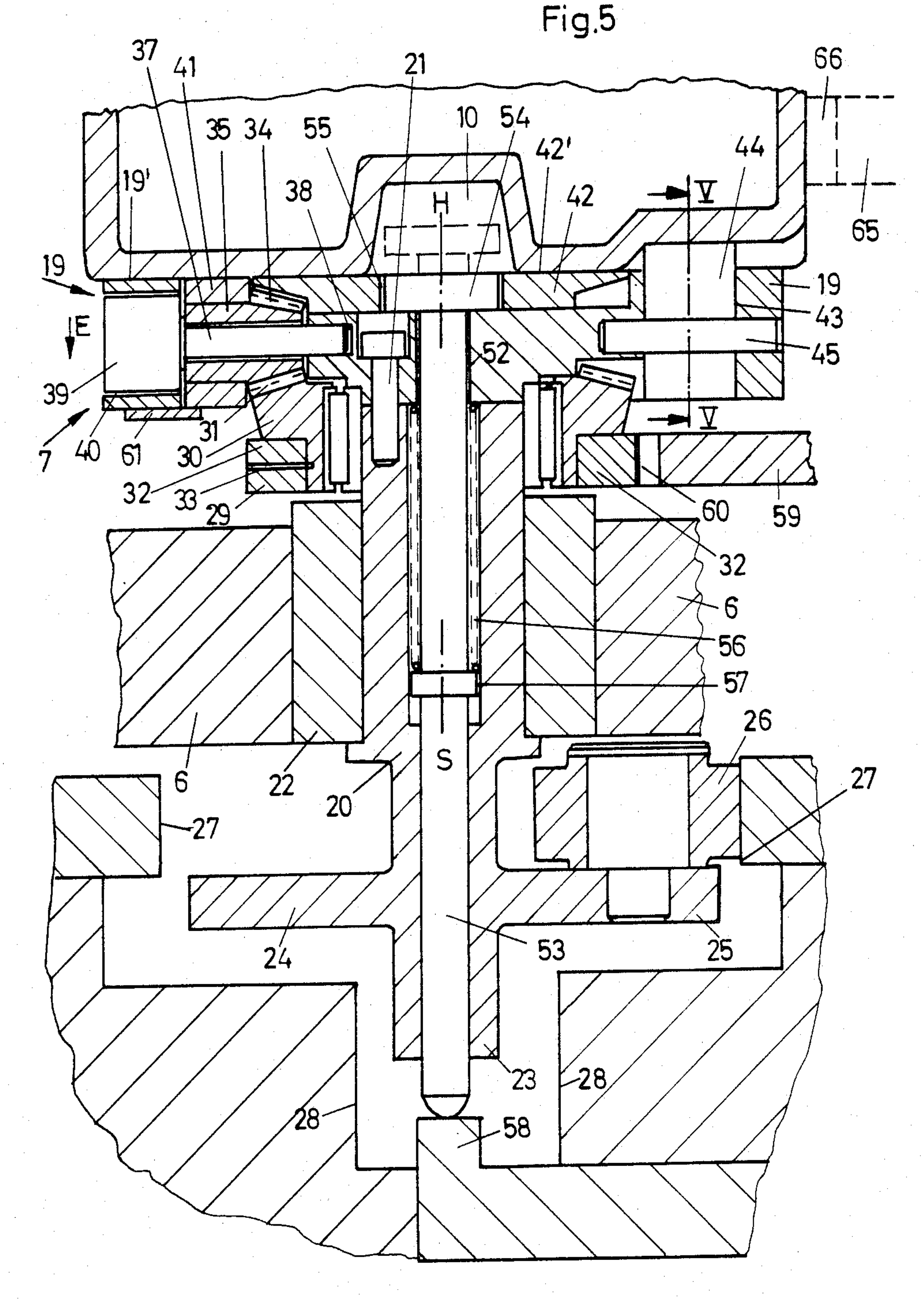

FIG. 5—a sectional view of a configuration of the rotary plate of the invention related labeling machine and the bottom area of a bottle standing on the rotary plate.

Figure 6:
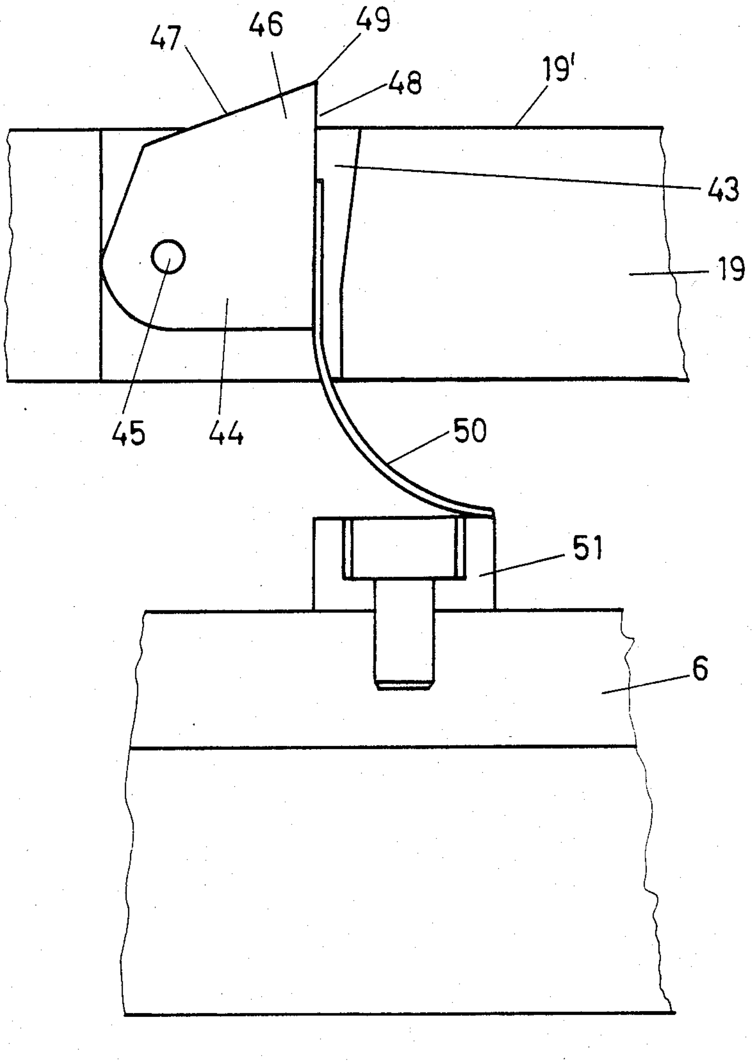

FIG. 6—a sectional view, being section V—V of FIG. 5.

Figure 7:
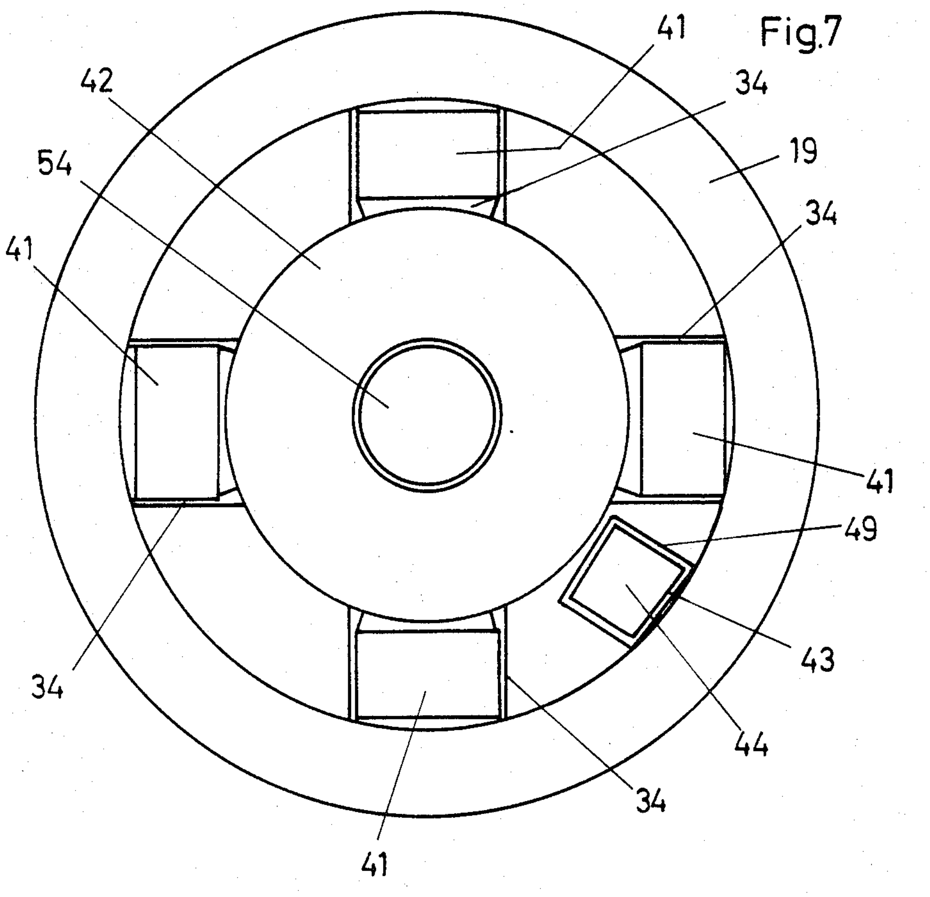

FIG. 7—a top view of the rotary plate as per FIG. 5.

Figure 8:
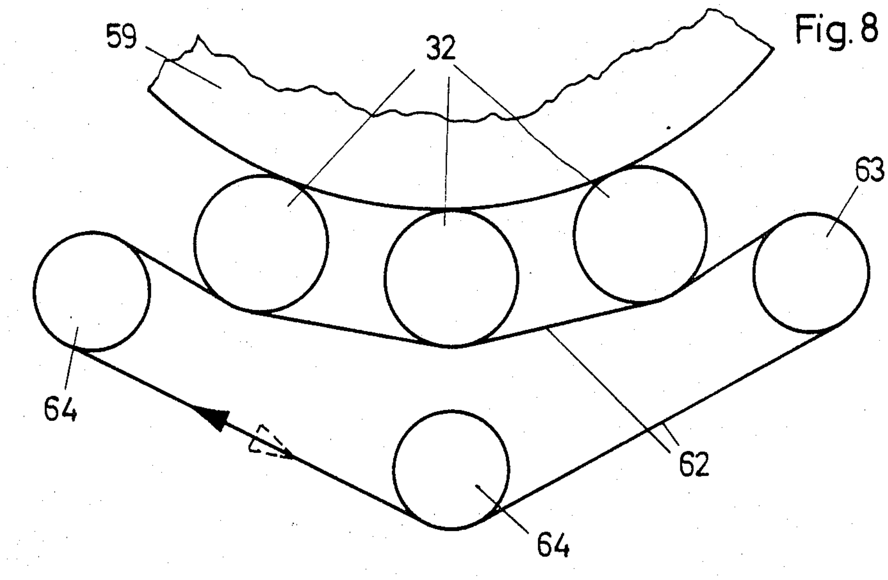

FIG. 8—a portrayal in diagram of several drives or drive possibilities for the movable part of the standing surface formed by rollers on the rotary plates as per FIG. 5.

FIG. 1 represents a labeling machine in part, to which already filled and closed off bottles 1 are fed in the direction of arrow A from the left via a conveyor system, e.g. via a hinged conveyor chain 2 and arrive in an infeed star 3, which is driven by appropriate drive means driven around a vertical axis in the direction of arrow B and has the well known multiple radially open pockets to accept one bottle 1 at the time. These pockets are not depicted in greater detail. With the aid of the infeed star 3 as well as a fixed guide bow 4, the bottles standing with their bottom 5 upright on a rotary table are conveyed so, that each and every bottle 1 ends up standing with its bottom 5 on a rotary plate 7 on the table 6.

FIG. 1 shows stat there are several rotary plates 7 at the upper side of the ring shaped part 6' of the rotary table 6 which is in the depicted configuration shown as spoked. In this case these rotary plates can be rotated or pivoted around the vertical axis by control components which will be described in greater detail at a later point and these rotary plates always have one and the same predetermined distance from each other.

By means of drive components, not portrayed in greater detail, the rotary table 6 is driven around its vertical axis in synchrously with the infeed star 3, namely in the opposite direction of the infeed star 3, i.e. in the direction of arrow C as in FIG. 1.

Since the labels 8 must be applied with the invention related labeling machine on a very specific predetermined spot on the circumference of the bottles 1 and the bottles are fed to the labeling machine so, that their elevation axis H is in vertical direction and since the bottles 1 have otherwise a random position, each bottle has at its bottom 5 an indentation or a hollow 9, which is in a predetermined area relative to that surface where the label will be applied later. The indentation 9 serving for the positioning of each individual bottle 1 is in the portrayed configuration shaped in the form of a keyway and runs radially to the elevation axis H. The indentation 9 is at one end near the periphery of the bottle 1 open and flows at the other end into a further indentation 10, which is in themiddle area of the bottom 5 of the bottle 1 and is formed arch or dome shaped and at the bottom section which reaches into the interior of the bottle 1. Between the indentation 10 and the outer edge, each bottle 1 has a ring shaped standing surface 5' at the bottom 5 in which standing surface 5' is also the indentation 9.

As shown in FIG. 4, the indentation 9 has a somewhat rriangle shaped cross section, namely in that form that the one lateral limiting surface 9' runs somewhat vertical to the standing surface 5' and the other lateral limiting surface runs obliquely to the standing surface 5'.

The bottles 1 which end up on the rotary plates 7 via the infeed star 3 are individually safeguarded against sliding off and falling over by a clamping device 11, whereby each clamping device 11 comes down upon the appropriate bottle 1 and envelopes this bottle at the upper end of the closed bottle neck with its bell shaped end 12 as soon as the bottle in question leaves the infeed star 3. The total of the clamping devices are attached to a machine part or rotor 13, which rotates with the rotary table 6. Only when the appropriate bottle 1 has arrived in a pocket 14 of the discharged star 15 and is held in this pocket and a guide 16 which partially surrounds the discharge star, the appropriate clamping device lifts off. The labeled bottles leave the labeling machine at the discharge side of the discharge star 15 via a conveyor belt 17 (e.g. a hinged conveyor chain) in the direction of arrow D.

The bottles, standing upright of the rotary plates 7 of the rotary table 6 are, amoung others, led past a labeling station or labeling mechanism 18, where each time one label 8 is applied to a bottle 1. Subsequently to this the bottles pass by not more closely detailed components (e.g. rollers, brushes and the like) with the help of which the final smoothing down of the labels 8 to the bottles 1 is achieved. To achieve an effective application of the labels 8 as well as an effective smoothing down of these labels onto the bottles 1, the rotary plates 7 and with them the bottles that stand upright on them are each time turned or pivoted around their elevation axis H into the required position. Besides this, the labels 8 must each time be applied exactly on a predetermined surface of the bottles and to this end the bottles 1 are, after leaving the infeed star 3 and before reaching the labeling mechanism 18 properly positioned by means of rotation (around the elevation axis H) relative to the rotary plate 7. To achieve this, each rotary plate 7 has a configuration as depicted for instance especially in the FIGS. 5 through 7.

As the FIGS. 5 through 7 show, each rotary plate 7 consists of a disc shaped part 19, the center or symmetric axis S of which coincides somewhat with the elevation axis H of the bottle 1 which stands on the rotary plate 7. To the bottom of the disc shaped part 19 a shell shaped body 20 is attached with its upper end facing upward, namely by means of screws 21, which screw into the tapped holes of the body 20 through the holes of part 19. The axis of the shell shaped body 20 coincides with the symmetric axis S. The shell shaped body 20, which has at its periphery a cylindrical shape is mounted in a bearing bushing 22 of the rotary table 6 around the center axis S, i.e. around a vertical axis so that the shell shaped body 20 can be rotated or pivoted. Instead of the slide bearing formed by the peripheral surface of the body 20 and the inner surface of the bearing bushing 22 one can of course, also use a ball or needle bearing.

At the lower end the body 20 changes into a shell shaped extension 23, the axis of which lies again parallel to the axis S. At the peripheral surface of the extension 23 there are a total of four arms that stand radially away from the extension 23.

For simplicity's sake only the two arms 24 and 25 are, relative to the axis S, off-set to each other by 180° and lie longitudinally in the drawing plane of FIG. 5. Two other arms—not drawn—lie longitudinally vertical to the drawing plane of FIG. 5 and are thus also, relative to the axis S, off-set to each other by 180°. These two arms—that are not drawn—stand also radially away from the extension 23 and form 90° angles with the arms 24 and 25. In the area of the free end of each arm there is a roller 26 which can rotate, namely around an axis parallel to the axis S. The arrangement of the rollers 26 is made so, that the rollers 26 on the arm 24 lie on a first common height level and the two rollers on the arm not drawn in FIG. 5 on a second common height level (relative to the axis S). The roller 26 of all the arms work in conjunction with the lateral limiting surfaces 27 and 28 of the two guide cam lying one above the other, which are on a fixed machine part of the labeling machine and envelope the vertical rotary axle of the rotary table 6. By means of a suitable configuration or shape of the control arms or an appropriate development of the limiting surfaces 27 and 28 it is achieved that, when the rotary table rotates, the rollers 26 which lie against the limiting surfaces 27 and 28, rotate or pivot the body 20 and with it the part 19 of each rotary plate 7 around the axle S into a position which is determined by the specific position of the limiting surfaces 27 and 28. The rollers 26 on the four arms in conjunction with the two control cams constitute an exceptionally simple means of control of the total of the rotary plates 7, but by means of an appropriate configuration and arrangement of the control cams the rotary plates 7 can be rotated around the axle S from any possible position in one direction or the other and practically limitless as regards the angle in which it is to be rotated.

A ring 30 which surrounds the body 20 is rotatably mounted via a bearing bushing 22 on the sleeve shaped body 20 by means of a needle bearing 29. This ring 30 is axially even with the axle S and shows at its upper part a bevel gear tooth system 31. Under this bevel gear tooth system 31 an auxiliary ring 32 is fixed in stationary position to the ring 30 namely by means of a radial pins33, which go through the holes of the auxiliary ring 32 and the ring 30

In the cut outs 34 of the disc shaped part 19 is each time a bevel gear rotatably mounted around an axle which runs radially to the axle S. A bearing bolt 37 serves as the shaft of each bevel gear 35, the teeth 36 of which mesh with the bevel gear tooth system 31. This bearing bolt 37 has a threaded end on one side and is with this end screwed into a threaded hole 38 is the disc shaped part 19. At the other end of each bearing bolt 37 is a circular cylindrical shaped head 39. Adapted to the diameter of this head 39 part 19 has a hole 40 by means of which this head in incorporated in the part 19.

Lateral to the tooth system 36 and opposite this tooth system relative to the axle S lying radially outward, each bevel gear 35 has a circular - cylindrical shaped section on which a flat ring 41, made of elastic material e.g. rubber, is held by a clamping seat. The outside diameter of this ring 41 has been chosen so, that this ring with a partial area of its peripheral surface protrudes slightly over the upper side 19' of the disc shaped part 19.

The configuration portrayed in the figure shows around the axle S a total of four bevel gears 35 as described before on the disc shaped part 19 which are each time off-set to each by 90°. The tooth systems 36 of the bevel gears 35 are covered by a cover 42, the top 42' of which aligns with the top 19' of the part 19.

In another cut-out 43 in the disc shaped part 19, a pawl 44, which forms the counter anvil, is mounted so that it can pivot, namely by means of a link pin 45, the axis of which runs perpendicular to the axle S and parallel to the upper part 19' of the disc shaped part 19. Furthermore, the axis of the link pin 45 or its extension intersects the circular shaped peripheral surface of the part 19 somewhat in the way of a secant.

The pawl 44 is formed by a metal block, the width of which in the direction of the link pin 45 is in the depicted configuration greater than the width of the ring 41 in the direction of the bearing bolt 37. The socket 44 has at its upper side a nose like or triangular shaped protrusion 46, where two surfaces 47 and 48 which meet each other at an acute angle, form a corner or edge 49, which lies somewhat radial to the axle S. The pawl 44 can pivot around the link pin 45 so that this socket including the section 46 of the pawl 44 protrudes beyond the upper side 19' of the part 19. In this second position as portrayed in FIG. 6 the surface 47 lies at an angle in relationship to the upper side 19', while the surface 48 runs vertical or practically vertical to the surface 19'.

The arrangement if furthermore so, that the pawl 44 is located between two neighboring bevel gears 35, whereby the section 46 has a distance from the axis S which corresponds with the distance between the rings 41 and the axle S.

On the one end of the surface 48, which shows a distance from the link pin 45 a leaf spring 50 is attached with one end and the other free end of the leaf spring lies beneath the underside of the part 19. The leaf spring 50 is shaped so, that it all but touches the upper side of the rotary table 6 when the pawl 45 is in the first position mentioned above. At the upper side of the rotary table 6 in the area of each rotary plate 7, a plate 51, that protrudes beyond the upper side of the rotary table 6, is attached so, that the lower free end of the leaf spring 50 in a certain rotation position of the rotary plate 7 or the disc shaped part of the part 19 comes into a position against the plate 51 and thereby rotates the pawl 44 into a second position whereby the section 46 protrudes beyond the upper side 19'. The rotary position, in which the leaf spring 50 lies against the plate 51 is thereby preferably that position which is shown by rotary plate 7 as it moves past the labeling mechanism 18. By means of the rotation of the individual rotary plates 7, achieved by the rollers 26 and the limiting surfaces 27 and 28, the pivoting of the pawl 44 from its first into its second position and visa versa is controlled as well. Of course, it is also possible to provide for other means to accomplish the pivoting of the pawl 44, e.g. control cylinders or push rods that adjoin a control cam etc.

In the center of the disc shaped part 19 there is a through hole 52, which extends in the hole of the sleeve shaped body 20 as well as its extension 23. In these holes there is a rod 53 which can slide in longitudinal direction. This rod 53 has at its upper end a cylindrical shaped head 54, which is located in a hole 55 in the cover 42.

In the hole of the sleeve shaped body 20 there is a compression spring 56 which surrounds the rod 53. The compression spring 56 rests with its lower end against a flange 57 on the rod 53 and with its upper end against a surface on the part 19 as in shown in FIG. 5. This compression spring 56 tries to push the rod 53 in its lower position as portrayed in FIG. 5, whereby the head 54 lies completely in the hole 55. The lower end of the rod 53 works in conjunction with a fixed control cam, 58 which forces the rod 53 upward at least in the area of the peripheral path of travel of the rotary table 6. In this area the positioning of the bottle 1 relative to the rotary plate 7 is achieved as well, which will be described hereafter. When the rod 53 is forced in the upward position the head 54 extends into the recess 10 and brings about an additional securing effect i.e. the centering of the appropriate bottle 1.

The modus operandi of each rotary plate 7 can be described as follows:

As already mentioned above, the bottles 1 are via an infeed star 3 fed to the bottle table 6 or the rotary plates 7 in upright position, however in a random position. In the area between the infeed star 3 and the labeling mechanism 18, the bottles 1 must be positioned so, that they must show an exact, predetermined position at least upon reaching the labeling mechanism 18 as regards the surface to where the label 8 should be transferred, i.e. the bottle should stand radially outward relative to the rotary axis of the rotary table 6. This is achieved thereby that each bottle 1, after having left the infeed star 3 arrives at a rotary plate 7 or the upper surface 19' of the part 19, whereby the pawl 44 lies completely in the cutout 43. The bottle 1 in question stands with its standing surface 5' on the rollers formed by the rings 41. The appropriate holding device 11 is lowered so far, that this holding device with its bell shaped section 12 comprises the closed off upper part of the bottle, however does not press heavily on the bottle. As soon as this condition exists, the rod 53 is forced upward via a control cam 58, so that the head 54 lies in the depression 10 as this is indicated by phantom lines in FIG. 5. By means of the rollers 26 and the limiting surfaces 27 and 28 of the control cam the part 19 is turned by a certain angle so, that the lower end of the leaf spring 50 comes to the position against the plate 51. The pawl 44 lies then with the section 46 like a spring against the standing surface 5' of the appropriate bottle. As soon as this situation is brought about, the auxiliary ring 32 comes in contact with a control cam 59 or with the wear surface 60 of this control cam as the rotary table 6 rotates. This control cam 59 is fixed and has a circular shape which is concentric the rotary axie of the rotary table 6. The auxiliary ring which rolls off against this wear surface rotates via its bevel gear tooth system 31 the bevel gears 35 and with them the standing surfaces, formed by the flat rings 41, for the appropriate bottle 1, which is rotated around its longitudinal axis H until the section 46 of the pawl 44 rests in the depression 9 of the bottle 1, whereby the surface 48 of the pawl 44 lies against the surface 9' of the bottle 1. As soon as this is brought about, the bottle 1 is positioned correctly relative to the rotary plate 7. The pawl 44 also prevents a further rotating of the bottle 1 around its longitudinal axis H, when the auxiliary ring 32 is still in contact with the wear surface 60. The wear surface 60 and the control cam 59 terminate before the labeling mechanism 18. The properly positioned bottle, standing on the rotary plate 7 can be labeled on the proper surface at the labeling mechanism 18.

After leaving the labeling mechanism 18, the rotary plate 7 and the bottle standing on it is then in the conventional method rotated or pivoted around the axis S or H to reach the other stations of labeling functions where the label 8 is pressed on or smoothed down. Just before reaching the labeling mechanism 18 and after the proper positioning of the bottle 1 as described above the holding device 11 is pressed against the bottle 1 so that, when the rotary plate 7 rotates and the leaf spring 50 does not come in contact with the plate 51, the appropriate bottle 1 stands on the rotary plate secured against further rotating, whereby the bevel gear tooth system 31 assures a sufficiently heavy action for the bevel gears 35 to avoid undesirable turning of the bottle 1 relative to the rotary plate 7. Furthermore the rings 41 made of elastic material warrants that the appropriate bottle 1 is pressed againstthe upper part 19' of the part 19 when the holding device 11 is applied securely. Another improvement against undesirable rotation of the bottle 1 relative to the rotary plate 7 can be achieved thereby, that the mounting of at least on bevel gear 35 is made in some form of elasticity, that the bevel gear is somewhat pressed downward in the direction of arrow E as in FIG. 5 when the holding device 11 is pressed against the bottle so that the ring 41 of the bevel gear with a surface 61 comes against part 19 and thereby blocks all bevel gears 35 so that they can not rotate.

As described above, a control cam 59 with wear surface 60 serves to rotate the auxiliary ring 32 or to position the bottles 1. Instead of this an endless belt 62 can be used (see FIG. 8). This belt is guided via a drive roller or drive pulley 63 via guide rollers or pulleys and lies with one length, against the auxiliary rings 32 of several rotary plates 7. These auxiliary rings are then preferably in the form of belt pulleys. The corresponding drive of the belt 62 in one or another direction or with different speeds when the rotary table 6 turns synchronously, can e.g. bring about a slow rotation of the bevel gears 35 when positioning the bottles 1 despite a high rotational speed of the rotary table 6. Consequently, the rotational speed of the bottles 1, turning around their longitudinal axis H when being positioned is also very low. This can be necessary to prevent damage of the bottles 1 when the pawl 44 rest in the depression 9. By means of the belt drive 62 in one or antoher direction it can be achieved that when the rotary table 6 rotates in one direction the bottles 1 can be rotated in one or another direction when being positioned. Thereby it is possible, that one and the same style bottle, i.e. bottles with one, specific depression 9 can be used on labeling machines with a rotary table 6 which turns clockwise or counter clockwise.

If the bottles to be labeled have a cylindrical surface, the invention related labeling machine can be simplified even further. In this case it is namely possible to dispose of the ring 30 and the auxiliary ring 32 and to engineer the bevel gears 35 as simple rollers with an elastic surface formed by the ring 41. The turning of the bottles 1 when being positioned relative to the appropriate rotary plates 7 is then achieved thereby, that provisions are made for a fixed control cam or control guide 65 with a wear surface 66 lateral across the surface 19', which control guide forms in turn a surface concentric with the rotational axis of the rotary table 6, with which surface the bottles 1 to be positioned come into contact with their peripheral surface after leaving the infeed star 3 as indicated by phantom lines in the FIGS. 1 through 5.

The invention is further explained by means of configurational examples. Variations and deviations are of course possible, without leaving the fundamental thoughts behind the invention. Thus it is possible for instance to substitute for the bevel gears 35 and the rollers, formed by the rings 11 a ring mounted on part 19 concentric with axis S and rotatable around this axis, while the bottles in question stand with its standing surface 5' on the part 19. This ring is then e.g. via an auxiliary ring 32 and the ring 30 driven so that it can rotate while the bottles 1 are being positioned. Or this ring can freely rotate, when the control guide 65 with its wear surface 66 is used.

It is furthermore possible in principle to substitute for the control guide 59 with the wear surface 60 or the belt 62, a bent element that is in the form of a toothed rod or a chain, which contacts a gear or sprocket respectively forms the auxiliary ring 32.

It is essential in all configurations of the invention related labeling machine that at infeed and discharge of each bottle to and from the rotary table 6 the rotary plate 7 has a completely level surface, i.e. neither the pawl 44 nor the head 54 protrude beyond the surface of the rotary plate 7. It is furthermore essential that there are jam surfaces 9' at the bottoms 5 of the bottles to be positioned, of such a nature that the jam surfaces are not damaged when the bottles are transported, i.e. rub or hit against each other. Consequently it is possible to reuse the bottles 1.

I claim:

1. A machine for labeling containers having a longitudinal axis which is oriented vertically and wherein each of the containers has a bottom surface provided with a jam which is oriented transversely relative to the container bottom surface and at least partially radial relative to the container longitudinal axis, said machine including labeling means and a work table which is moveable relative to the labeling means, a plurality of plates mounted on said table in a spaced apart relation for rotation about a vertical axis, each of said plates defining a container supporting surface extending around its respective rotational axis, holding means mounted above each plate for vertical movement relative thereto, a counter jam disposed on each of said rotary plates and being moveable from a first position where it is below the container supporting surface of its respective plate to a second position disposed above said surface for cooperation with the jam of a container positioned on the container supporting surface, at least three rollers mounted on each of said rotary plates for providing relative rotational movement around a vertical axis between a container positioned in the container surface of each plate and the counter jam thereof, the rollers of each group being positioned with a part of their peripheral surface disposed above its respective rotary plate to define container supporting means, each roller being mounted for rotation about an axis which extends radially relative to the longitudinal axis of a container disposed on the rotary plate, and drive means for rotating the rollers about their respective rotational axis.

2. A machine for labeling containers oriented generally vertically and having a longitudinal axis and a bottom surface provided with a jam oriented transversely and at least partially radially to the longitudinal axis of the container, said machine including labeling means and a work table moveably mounted relative to the labeling means, a plurality of plates spaced apart from each other and each mounted for rotation about a vertical axis on said work table and each defining a label supporting surface extending around its vertical axis of rotation, holding means mounted above each rotary plate for vertical movement relative thereto, a counter jam disposed on each rotary plate, said counter jam being moveable from a first position where it is below the container supporting surface into a second position where the counter jam extends above the container supporting surface for cooperating with the jam of a container positioned on the container supporting surface, a plurality of rotary members each having a circular outer periphery, said rotary members being rotatably mounted on the rotary plates and around the vertical rotational axis of each of the rotary plates for providing relative rotational movement around the longitudinal container axis and between a container positioned on the container surface and each of the rotary plates and its respective counter jam, and driving means for driving the circular members around the container longitudinal axis.

3. The labeling machine set forth in claims 1 or 2 including gear means associated with the rollers, said driving means including at least one ring having gear means engaging the gear means of the rollers.

4. The labeling machine set forth in claim 3 and including a fixed control guide associated with each rotary plate and each having a surface disposed laterally of the plate and extending along at least a part thereof, said ring rotating on the surface of the control guide upon rotation of the work table.

5. The labeling machine set forth in claim 4 and wherein the surface of the control guide is a wear surface.

6. The labeling machine set forth in claim 4 wherein the surface of the control guide has a gear means which meshes with the gear means of the one ring of the drive means.

7. The labeling meachine as set forth in claim 3 and including a drive roller and a guide roller, an endless belt extending around said drive and guide rollers with at least one ring of the driving means engaging said endless belt.

8. The labeling machine set forth in claims 1 or 2 and including spring means disposed on each rotary plate, said spring means biasing the counter jam to its second position whereby the counter jam when in its second position can be pressured back into its first position against the biasing effect of the spring means.

9. The labeling machine as set forth in claims 1 or 2 and including a control cylinder for displacing the counter jam between its first and second positions.

10. The labeling machine as set forth in claims 1 or 2 and including means for displacing the counter jam between its first and second positions, and a plurality of control cams one of which is rotatably mounted about each axis of rotation of the plates and coupled to the counter jam displacement means.

11. The labeling machine as set forth in claim 10 wherein the counter jam displacement means comprises a spring.

12. The labeling machine as set forth in claim 11 wherein said spring comprises a leaf spring.

13. The labeling machine as set forth in claims 1 or 2 wherein the counter jam comprises a pawl pivotally mounted on each of the rotary plates.

14. The labeling machine as set forth in claim 13 and including a plurality of control cams one of which is rotatably mounted about each axis of rotation of the rotary plates, spring means fixed to said pawl and cooperating with said control cam.

15. The labeling machine as set forth in claim 14 wherein said spring compises a leaf spring.

16. The machine set forth in claim 2 wherein the circular members are discs.

17. The machine set forth in claim 2 wherein the circular members are rings.

* * * * *